United States Patent
An

(10) Patent No.: US 8,078,145 B2
(45) Date of Patent: *Dec. 13, 2011

(54) MOBILE COMMUNICATION SYSTEM AND MOBILE TERMINAL HAVING FUNCTION OF INACTIVATING MOBILE COMMUNICATION VIRUSES, AND METHOD THEREOF

(75) Inventor: Ki Chul An, Kyoungki-do (KR)

(73) Assignee: Pantech Co., Ltd., Seoul (KR)

( * ) Notice: Subject to any disclaimer, the term of this patent is extended or adjusted under 35 U.S.C. 154(b) by 740 days.

This patent is subject to a terminal disclaimer.

(21) Appl. No.: 12/150,905

(22) Filed: May 1, 2008

(65) Prior Publication Data

US 2008/0214171 A1 Sep. 4, 2008

Related U.S. Application Data

(63) Continuation of application No. 10/602,810, filed on Jun. 24, 2003, now Pat. No. 7,386,297.

(30) Foreign Application Priority Data

Dec. 28, 2002 (KR) .................. 10-2002-0085938

(51) Int. Cl.
*H04M 3/16* (2006.01)
*H04M 3/00* (2006.01)

(52) U.S. Cl. .......... 455/410; 455/418; 709/246; 726/22; 726/24

(58) Field of Classification Search .................. 455/410, 455/411, 414.1, 557, 566, 550.1, 412.2, 418, 455/419, 420; 726/11, 13, 22, 24; 709/224, 709/246

See application file for complete search history.

(56) References Cited

U.S. PATENT DOCUMENTS

| | | | |
|---|---|---|---|
| 5,889,943 | A | 3/1999 | Ji et al. |
| 5,948,104 | A | 9/1999 | Gluck et al. |
| 6,240,530 | B1 | 5/2001 | Togawa |
| 6,347,375 | B1 | 2/2002 | Reinert et al. |
| 6,842,861 | B1 * | 1/2005 | Cox et al. ........ 713/188 |
| 7,203,681 | B1 * | 4/2007 | Arnold et al. ........ 1/1 |
| 7,210,168 | B2 | 4/2007 | Hursey et al. ........ 726/24 |
| 7,231,440 | B1 | 6/2007 | Kouznetsov et al. ........ 709/224 |
| 7,266,845 | B2 * | 9/2007 | Hypponen ........ 726/24 |

(Continued)

FOREIGN PATENT DOCUMENTS

EP 0 638 184 B1 10/1997

(Continued)

OTHER PUBLICATIONS

"Security on the Gateways" A white paper by MicroWorld Software Services Pvt. Ltd. XP-002245105 (2000).

(Continued)

*Primary Examiner* — Binh Tieu
(74) *Attorney, Agent, or Firm* — H.C. Park & Associates, PLC

(57) ABSTRACT

The present invention provides a mobile communication system and method for inactivating or curing mobile communication viruses. The mobile communication system for inactivating a virus includes: a database associated with the mobile communication system, for storing at least one virus vaccine program; and a virus monitoring unit associated with the mobile communication system, for checking virus infection of received data, analyzing virus information, choosing one of virus vaccine programs that are stored in the database and inactivating the virus. Virus vaccine programs are timely updated over the air (OTA) whenever a new version of vaccine program is available.

10 Claims, 5 Drawing Sheets

U.S. PATENT DOCUMENTS

| | | |
|---|---|---|
| 7,299,035 B2 | 11/2007 | Morota et al. ............... 455/418 |
| 7,308,256 B2 * | 12/2007 | Morota et al. ............... 455/418 |
| 7,673,150 B2 * | 3/2010 | Cox et al. ..................... 713/188 |
| 2002/0132607 A1 | 9/2002 | Castell et al. ................ 455/412 |
| 2003/0074581 A1 | 4/2003 | Hursey et al. ................ 713/201 |
| 2003/0088705 A1 | 5/2003 | Katagishi et al. ............ 709/246 |
| 2003/0157930 A1 | 8/2003 | Morota et al. ............... 455/418 |
| 2003/0162575 A1 | 8/2003 | Morota et al. ............... 455/575 |
| 2004/0005873 A1 * | 1/2004 | Groenendaal et al. ........ 455/410 |
| 2006/0191011 A1 | 8/2006 | Korkishko et al. ............. 726/24 |
| 2008/0060075 A1 * | 3/2008 | Cox et al. ........................ 726/24 |

FOREIGN PATENT DOCUMENTS

| | | |
|---|---|---|
| EP | 1184772 | 3/2002 |
| JP | 2002-197006 | 7/2002 |
| KR | 1020000063357 | 11/2000 |
| KR | 1020020002953 | 1/2002 |
| KR | 1020020022314 | 3/2002 |
| KR | 20-0299787 | 12/2002 |
| KR | 2003-0021859 | 3/2003 |
| WO | WO 01/73523 A2 | 10/2001 |
| WO | WO0219109 A1 | 3/2002 |

OTHER PUBLICATIONS

European Search Report dated Jun. 15, 2011, for EP Application No. 03 254 057.7, which corresponds to U.S. Appl. No. 12/150,905.

Non-Final Office Action dated Aug. 8, 2007 (from co-pending U.S. Appl. No. 10/602,810).

Notice of Allowance dated Jan. 28, 2008 (from co-pending U.S. Appl. No. 10/602,810).

* cited by examiner

US 8,078,145 B2

MOBILE COMMUNICATION SYSTEM AND MOBILE TERMINAL HAVING FUNCTION OF INACTIVATING MOBILE COMMUNICATION VIRUSES, AND METHOD THEREOF

CROSS-REFERENCE TO RELATED APPLICATIONS

This application is a continuation application of U.S. patent application Ser. No. 10/602,810, filed on Jun. 24, 2003 and now issued as U.S. Pat. No. 7,386,297, which claims priority from and the benefit of Korean Patent Application No. 10-2002-0085938, filed on Dec. 28, 2002.

FIELD OF THE INVENTION

The present invention relates to a mobile communication system and a mobile terminal which are capable of inactivating or curing mobile communication viruses and a method thereof.

PRIOR ART OF THE INVENTION

Generally, a virus vaccine program is downloaded from, e.g., a personal computer and installed in a mobile terminal to cure a mobile communication virus (hereinafter, referred to as simply "virus") in a mobile terminal such as mobile phones or PDAs. Such a method is very inconvenient in that a user has to download a new version of virus vaccine program by himself/herself whenever the virus vaccine program is updated.

Also, since system level components such as a mobile switching center (MSC) can not currently identify or detect whether or not data externally transmitted, for example, from a mobile terminal is infected by viruses, the mobile communication system may be infected by data having viruses, and thus mobile terminals communicating therewith as well as the mobile communication system may be infected by viruses.

SUMMARY OF THE INVENTION

It is an object of the present invention to provide a mobile communication system and method for inactivating or curing mobile communication viruses.

It is another object of the present invention to provide a mobile terminal of inactivating or curing mobile communication viruses.

It is further object of the present invention to provide a method of updating a virus vaccine program.

In accordance with one aspect of the present invention, there is provided a mobile communication system for inactivating a virus, including: a database associated with the mobile communication system, for storing at least one virus vaccine program; and a virus monitoring unit associated with the mobile communication system, for checking virus infection of received data, analyzing virus information, choosing one of virus vaccine programs that are stored in the database and inactivating the virus.

Further, in accordance with another aspect of the present invention, there is provided a method for inactivating viruses in a mobile communication system, including: (a) at a virus monitoring unit, detecting virus infection of data received from a mobile terminal; (b) at the virus monitoring unit, analyzing virus information when data are virus infected; and (c) at the virus monitoring unit, choosing suitable one of virus vaccine programs that are stored in a database according to the virus information to inactivate the virus.

Further, in accordance with still another aspect of the present invention, there is provided a mobile terminal, including: receiving a virus infection notification from a virus monitoring unit and detecting a virus infection of the mobile terminal to inactivate viruses by using a virus vaccine program stored therein; and transmitting a vaccine request message to the virus monitoring unit to receive a virus vaccine program suitable for the detected virus to thereby inactivate the virus by using the received virus vaccine program when the virus vaccine program previously stored in the mobile terminal can not inactivate the virus.

Further, in accordance with still another aspect of the present invention, there is provided a method for inactivating viruses in a mobile communication system, including: (a) at a mobile terminal, detecting a virus infection of data before transmitting data and inactivating the virus using a vaccine program stored in the mobile terminal when the virus is detected; (b) at the mobile terminal, sending a vaccine request message to a virus monitoring unit when the vaccine program stored in the mobile terminal cannot inactivate the virus; and (c) at the mobile terminal, receiving a new vaccine program which is transmitted from the virus monitoring unit in response to the vaccine request message.

Further, in accordance with one aspect of the present invention, there is provided a method for updating a virus vaccine program in a mobile communication system, including: (a) at a mobile terminal, receiving a vaccine information request message from a virus monitoring unit; (b) at the mobile terminal, sending a vaccine information response message including vaccine program information and capability information of the mobile terminal to a virus monitoring unit in response to the vaccine information request message; and (c) at the mobile terminal, receiving a vaccine program chosen according to the vaccine program information and the capability information of the mobile terminal.

Further, in accordance with another aspect of the present invention, there is provided a method for updating a virus vaccine program in a mobile communication system, including: (a) at a virus monitoring unit, sending a vaccine information request message to a mobile terminal; (b) at the virus monitoring unit, receiving a vaccine information response message including vaccine program information and capability information of the mobile terminal; and (c) at the virus monitoring unit, sending a vaccine program chosen according to the vaccine program information and the capability information of the mobile terminal to the mobile terminal.

Further, in accordance with still another aspect of the present invention, there is provided a method for updating a virus vaccine program in a mobile communication system, including: (a) at a mobile terminal, sending a vaccine update request message including vaccine program information and capability information of the mobile terminal to a virus monitoring unit; and (b) at the mobile terminal, receiving a vaccine program chosen according to the vaccine program information and the capability information of the mobile terminal from the virus monitoring unit.

Further, in accordance with still another aspect of the present invention, there is provided a method for updating a virus vaccine program in a mobile communication system, including: (a) at a virus monitoring unit, receiving a vaccine update request message including vaccine program information and capability information of the mobile terminal from the mobile terminal; and (b) at the virus monitoring unit, sending a vaccine program chosen according to the vaccine program information and the capability information of the mobile terminal to the mobile terminal.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Figure 1:
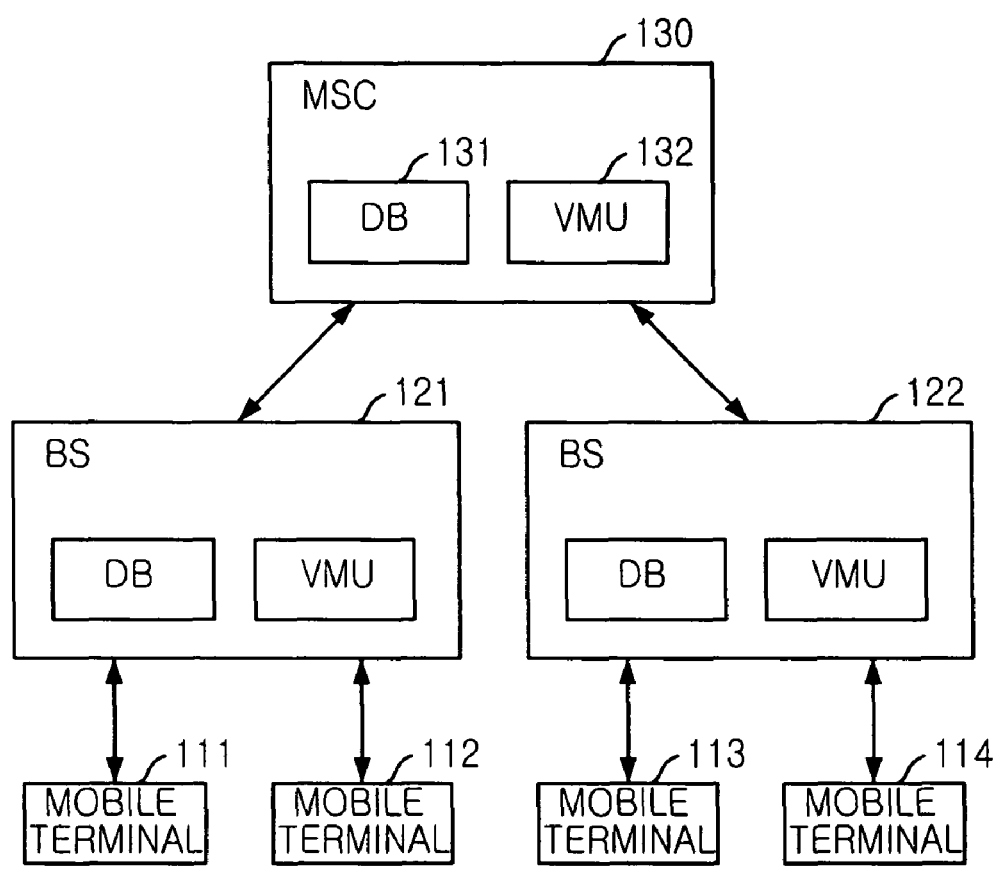
FIG. 1 is a block diagram showing a mobile communication system for inactivating or curing mobile communication viruses in accordance with an embodiment of the present invention.

FIG. 1 is a block diagram showing a mobile communication system for inactivating or curing mobile communication viruses (hereinafter, referred to as simply "virus") in accordance with an embodiment of the present invention.

The mobile communication system of FIG. 1 includes at least one mobile terminal 111 to 114, at least one base station (BS) 121 to 122 and a mobile switching center (MSC) 130.

The mobile terminal 111 to 114 respectively stores a virus vaccine program for curing or inactivating viruses in the mobile terminal and checks whether it is infected by viruses preferably before transmitting data.

The BSs 121 to 122 and/or the MSC 130 is functionally associated with a database (DB) 131 and a virus monitoring unit (VMU) 132. However, the system-level components with which the DB 131 and the VMU 132 are associated are not limited to the BS and the MSC. For example, the VMU 132 can be configured to be associated to a router which is connected to the Internet.

The DB 131 stores various vaccine programs and is updated and managed by a system operator.

The VMU 132 substantially controls a function of detecting viruses and inactivating or curing viruses and a function of updating a virus vaccine program.

Figure 2:
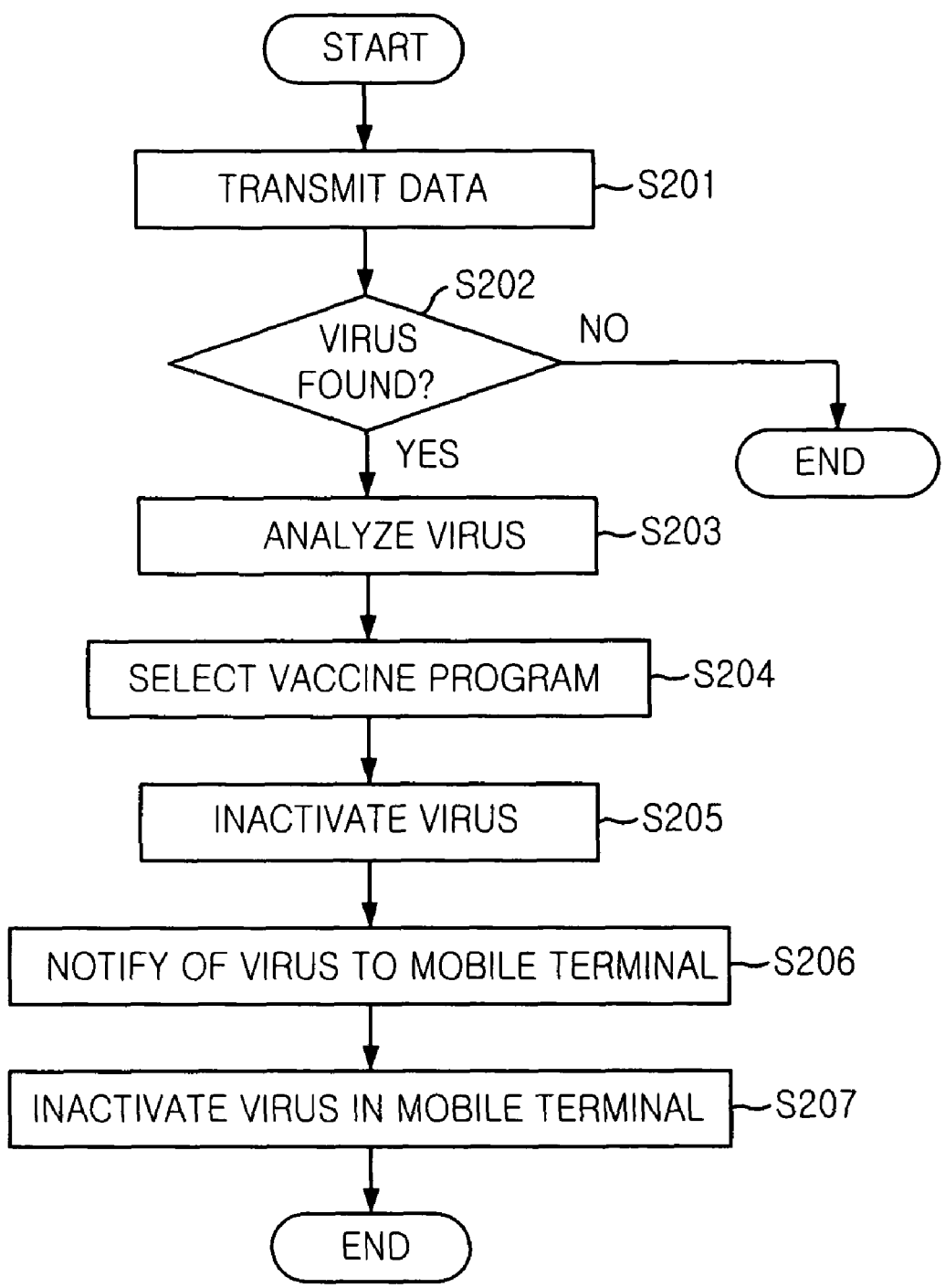
FIGS. 2 and 3 are flow charts showing procedures of inactivating or curing viruses in the mobile communication system in accordance with the present invention.

Operation of the mobile communication system of FIG. 1 is explained below with reference to FIGS. 2 and 3.

Data are transmitted from at least one of mobile terminals 111 to 114 to the corresponding base stations 121 and 122 at step S201.

Even though it is described that data is transmitted between two mobile terminals, data can be transmitted through the wireless Internet, and a kind of a data transmitting device is not limited to the mobile terminal in accordance with the present invention.

Then, it is determined whether or not a virus is found or detected in the data at step S202. If a virus is detected in the data, information (e.g., identity) of the virus is analyzed at step S203. A virus vaccine program suitable for an identified virus is read from the DB 131 at step S204. The virus in data inactivated or cured by using the read virus vaccine program at step S205. Then, the cured data is transmitted to a destination mobile terminal, and the virus monitoring unit 132 notifies the mobile stations 111 to 114 of virus infection at step S206. The mobile terminals which receive the notification perform operation of inactivating or curing the virus therein at step S207.

The mobile terminal which receives the virus infection notification performs operation of detecting viruses. If it is determined as infected, the mobile station determines whether it can be inactivated or cured by the vaccine program stored therein at step S301.

If the virus can not be inactivated or cured by the vaccine program stored in the mobile terminal, the mobile terminal send a vaccine request message to the VMU 132 through the base station at step S302. At step S303, the VMU 132 chooses a suitable virus vaccine program from the DB 131 and transmits to the mobile terminal or updates the virus vaccine program over the air when the virus vaccine program is an old version. At step S304, the mobile terminal inactivates or cures the virus using the downloaded vaccine program.

The vaccine request message includes a vaccine field that states version information of the virus vaccine program in the mobile terminal, a virus information field that states identity of virus and a capability field that includes, for example, a band, mode information and operating system (OS) information of the mobile terminal.

The VMU 132 chooses suitable one of the virus vaccine programs that are stored in the DB 131 according to the virus information field and the capability field in the vaccine request message. Then, the VMU 132 transmits the selected virus vaccine program to the mobile terminal and updates the virus vaccine program in the mobile terminal.

Figure 3:
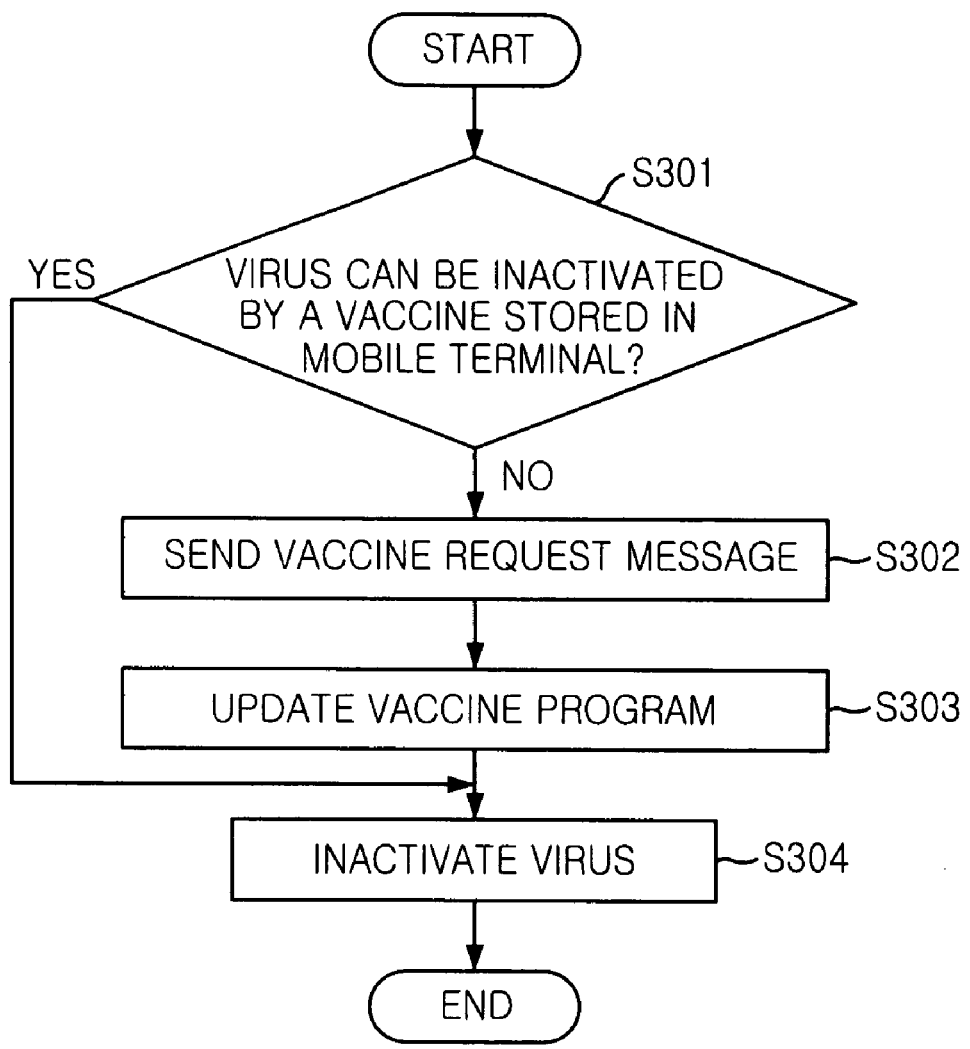

Also, when the mobile terminal detects or finds the virus by itself but can not inactivate or cure the virus by the virus vaccine program stored therein, the mobile terminal can send the vaccine request message to the VMU 132 to receive or update the virus vaccine program by the way of FIG. 3.

Meanwhile, there are two methods of updating virus vaccine program stored in the mobile terminal: a network-initiated method; and a user-initiated method.

Figure 4:
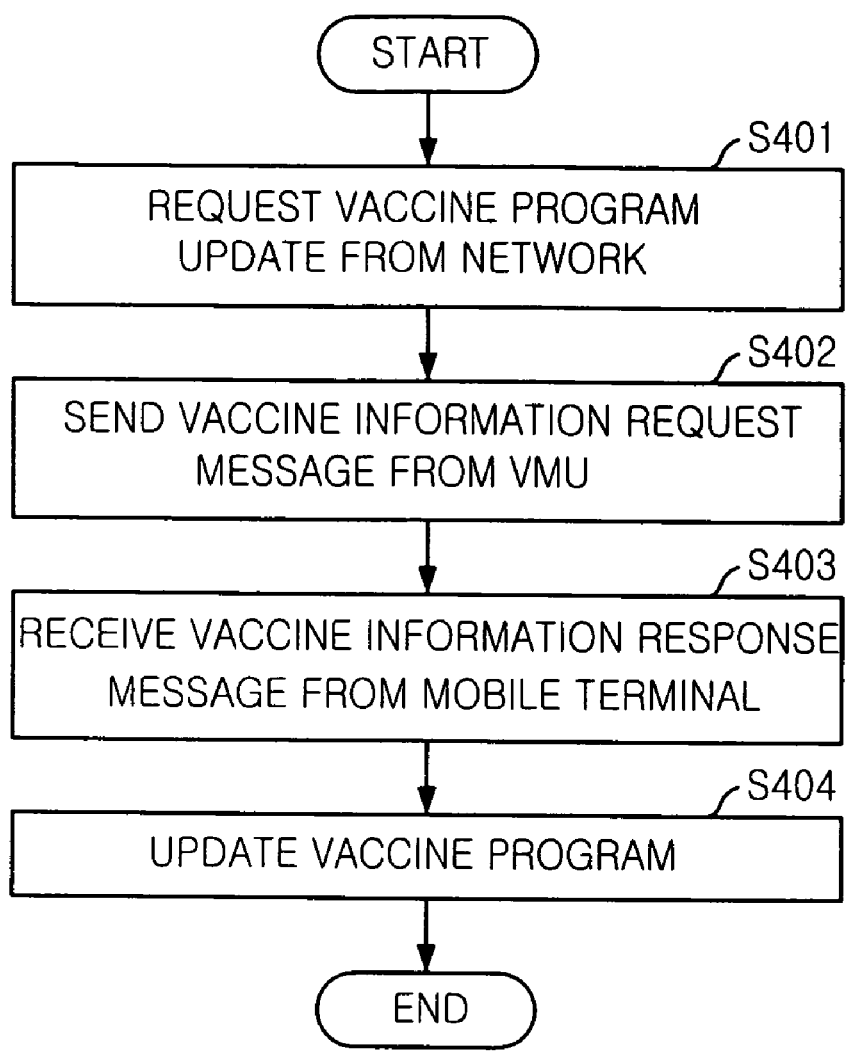
FIG. 4 is a flow chart showing a network-initiated update method for updating a virus vaccine program in accordance with the present invention.

FIG. 4 is a flow chart showing a network-initiated update method for updating a virus vaccine program stored in the mobile terminal in accordance with the present invention.

The network-initiated update method is executed by a service provider when a new version of the vaccine program is available or a new virus appears.

When the vaccine program in the DB 131 is updated at step S401, the VMU 132 sends a vaccine information request message to the mobile terminals 111 to 114 at step S402. In response to the vaccine information request message, the mobile terminals 111 to 114 send vaccine information response messages including the vaccine program information and the capability information to the VMU 132 at step S403.

At step S404, the VMU 132 chooses suitable one the virus vaccine programs that are stored in the DB 131 according to the vaccine program information and the capability information of the mobile terminal. Then, the VMU 132 sends the selected virus vaccine program to the mobile terminal, thereby updating the virus vaccine program in the mobile terminal.

Figure 5:
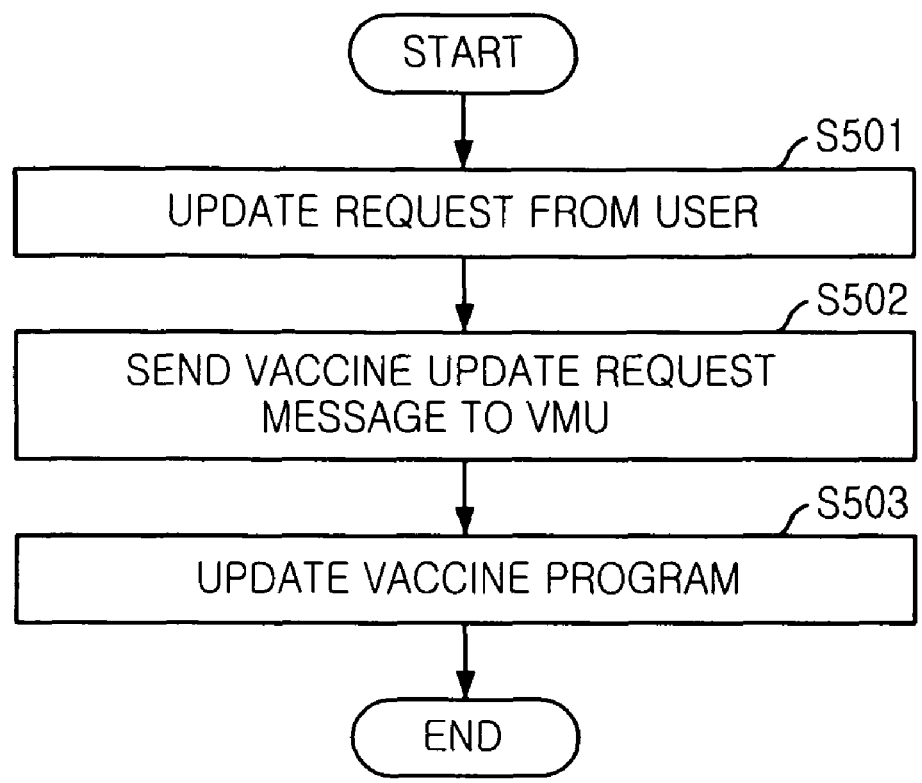
FIG. 5 is a flow chart showing a user-initiated update method for updating a virus vaccine program in accordance with the present invention.

FIG. 5 is a flow chart showing a user-initiated update method for updating virus vaccine program stored in the mobile in accordance with the present invention.

A user requests updating of the vaccine program at step S501, the mobile terminals 111 to 114 send a vaccine update request message including the vaccine program information and the capability information to the VMU 132 at step S502.

At step S503, the VMU 132 chooses a corresponding vaccine program from the DB 131 according to the capability of the mobile terminal. Then, the VMU 132 sends the selected virus vaccine program to the mobile terminal, thereby updating the virus vaccine program in the mobile terminal. The vaccine program update is executed over the air.

As described herein before, the mobile communication system of the present invention has the following advantages. Since the data base storing various vaccine programs and the virus monitoring unit are associated with the system level component such as a mobile switching center, virus infection of data transmitted is detected in real time, and a vaccine program suitable for detected virus is provided to the mobile terminal, whereby the mobile communication network and the mobile terminals therewith can be protected from mobile communication viruses.

Also, since virus vaccine programs are timely updated over the air (OTA) whenever a new version of vaccine program is available, it is convenient to users, and both the mobile communication system and the mobile terminal are safe from viruses as well.

While the present invention has been shown and described with respect to the particular embodiments, it will be apparent to those skilled in the art that many changes and modifications may be made without departing from the spirit and scope of the invention as defined in the appended claims.

What is claimed is:

1. A method for inactivating viruses in a mobile communication system, comprising:
   at a mobile terminal, transmitting data to a virus monitoring unit associated with the mobile communication system;
   at the virus monitoring unit, checking a virus infection of the data and notifying the virus infection of the data to the mobile terminal when the data are virus infected; and
   at the mobile terminal, receiving the virus infection notification and inactivating viruses by using a virus vaccine program stored therein.

2. A mobile communication system for inactivating viruses, comprising:
   a virus monitoring unit being associated with the mobile communication system, the virus monitoring unit to check a virus infection of data and to notify the virus infection of the data when the data are virus infected; and
   a mobile terminal to transmit the data to the virus monitoring unit and to inactivate viruses by using a virus vaccine program stored therein when being notified of the virus infection of the data from the virus monitoring unit.

3. A method for inactivating viruses in a mobile communication system, comprising:
   at a mobile terminal, transmitting data to a virus monitoring unit associated with the mobile communication system;
   at the virus monitoring unit, checking a virus infection of the data and notifying the virus infection of the data when the data are virus infected;
   at the mobile terminal, transmitting a vaccine request message to the virus monitoring unit when a first virus vaccine program previously stored in the mobile terminal cannot inactivate the virus;
   at the virus monitoring unit, receiving the vaccine request message and transmitting a second virus vaccine program suitable for curing the detected virus in response to the vaccine request message;
   at the mobile terminal, receiving the second virus vaccine program and inactivate the detected virus by using the received second virus vaccine program.

4. The method as recited in claim 3, wherein the vaccine request message includes vaccine program information and capability information of the mobile terminal.

5. A mobile communication system for inactivating viruses comprising:
   a virus monitoring unit to check a virus infection of data transmitted from a mobile terminal, to notify the virus infection of the data to the mobile terminal when the data are virus infected, to receive a vaccine request message from the mobile terminal and to transmit a first virus vaccine program suitable for curing the virus infection in response to the vaccine request message; and
   the mobile terminal to transmit data to the virus monitoring unit, to transmit the vaccine request message to the virus monitoring unit when a second virus vaccine program previously stored in the mobile terminal cannot inactivate the virus infection, to receive the first virus vaccine program, and to inactivate the virus infection by using the received first virus vaccine program.

6. The mobile communication system as recited in claim 5, wherein the vaccine request message includes vaccine program information and capability information of the mobile terminal.

7. A method for inactivating viruses in a mobile communication system, comprising:
   at a mobile terminal, detecting a virus infection of data before transmitting data and inactivating the virus using a first vaccine program stored in the mobile terminal when the virus is detected;
   at the mobile terminal, sending a vaccine request message to a virus monitoring unit associated with the mobile communication system when the first vaccine program stored in the mobile terminal cannot inactivate the virus;
   at the virus monitoring unit, choosing one of virus vaccine programs that are stored in a database according to the vaccine request message received from the mobile terminal and sending a second virus vaccine to the mobile terminal; and
   at the mobile terminal, receiving the second vaccine program which is transmitted from the virus monitoring unit and inactivating the virus with the second vaccine program.

8. The method as recited in claim 7, wherein the vaccine request message includes vaccine program information and capability information of the mobile terminal.

9. A method for updating a virus vaccine program in a mobile communication system, comprising:
   (a) at a virus monitoring unit associated with the mobile communication system, sending a vaccine information request message to a mobile terminal;
   (b) at the mobile terminal, sending a vaccine information response message including vaccine program information and capability information of the mobile terminal to the virus monitoring unit in response to the vaccine information request message;
   (c) at the virus monitoring unit, sending a vaccine program chosen according to the vaccine program information and the capability information of the mobile terminal to the mobile terminal;
   (d) at the mobile terminal, receiving the vaccine program; and
   (e) at the mobile terminal, detecting a virus infection of data before transmitting the data and inactivating the virus with the received vaccine program.

10. A method for updating a virus vaccine program in a mobile communication system, comprising:

(a) at a mobile terminal, sending a vaccine update request message including vaccine program information and capability information of the mobile terminal to a virus monitoring unit;

(b) at the virus monitoring unit, sending a vaccine program chosen according to the vaccine program information and the capability information of the mobile terminal to the mobile terminal in response to the vaccine update request message;

(c) at the mobile terminal, receiving the vaccine program; and (d) at the mobile terminal, detecting a virus infection of data before transmitting the data and inactivating the virus with the received vaccine program.

* * * * *